(12) United States Patent
Taschek

(10) Patent No.: US 12,001,591 B2
(45) Date of Patent: Jun. 4, 2024

(54) METHODS AND SYSTEMS FOR PROTECTING DATA INTEGRITY

(71) Applicant: salesforce.com, inc., San Francisco, CA (US)

(72) Inventor: John Walter Taschek, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/333,003

(22) Filed: Jun. 12, 2023

(65) Prior Publication Data
US 2023/0325533 A1 Oct. 12, 2023

Related U.S. Application Data

(63) Continuation of application No. 17/301,545, filed on Apr. 6, 2021, now Pat. No. 11,714,923, which is a continuation-in-part of application No. 14/498,666, filed on Sep. 26, 2014, now abandoned.

(60) Provisional application No. 61/882,947, filed on Sep. 26, 2013.

(51) Int. Cl.
*G06F 21/64* (2013.01)
(52) U.S. Cl.
CPC ................... *G06F 21/64* (2013.01)
(58) Field of Classification Search
CPC ....... H04L 9/3247; H04L 9/321; G06F 21/64; G06F 21/60
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Khalid M Almaghayreh
(74) *Attorney, Agent, or Firm* — Weaver Austin Villeneuve & Sampson LLP

(57) ABSTRACT

Disclosed implementations may include receiving a first communication comprising first content generated by a first user; identifying authentication metadata embedded within the first communication; receiving a second communication generated by a second user, wherein the second communication comprises second content and the authentication metadata; decoding the authentication metadata from the second communication; parsing the first content of the first communication and the second content of the second communication; determining that the first content is different than the second content based at least in part on the parsing; and generating an alteration notification based at least in part on the determining.

20 Claims, 10 Drawing Sheets

(56) References Cited

U.S. PATENT DOCUMENTS

| | | | |
|---|---|---|---|
| 5,892,900 A | 4/1999 | Ginter et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,212,504 B1 * | 4/2001 | Hayosh | B42D 25/29 705/72 |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly et al. | |
| 7,945,653 B2 | 5/2011 | Zuckerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,472,727 B2 * | 6/2013 | Gronau | G06V 30/12 358/1.14 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,601,504 B2 | 12/2013 | Stone et al. | |
| 8,646,103 B2 | 2/2014 | Jakobson et al. | |
| 9,652,460 B1 * | 5/2017 | Barisic | G06F 16/2471 |
| 11,714,923 B2 | 8/2023 | Taschek | |
| 2001/0044791 A1 | 11/2001 | Richter et al. | |
| 2002/0060736 A1 * | 5/2002 | Wakao | H04N 1/32128 348/207.99 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0114670 A1* | 5/2005 | Bowe ............... H04L 9/3247 713/180 |
| 2008/0028220 A1* | 1/2008 | Wyssen ........... H04N 1/00129 713/176 |
| 2008/0228733 A1 | 9/2008 | Davis et al. |
| 2008/0249972 A1 | 10/2008 | Dillon |
| 2008/0288509 A1* | 11/2008 | Mysen ................ G06F 16/951 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0150740 A1 | 6/2012 | Isaacson et al. |
| 2012/0233137 A1 | 9/2012 | Jakobson et al. |
| 2012/0290407 A1 | 11/2012 | Hubbard et al. |
| 2013/0166538 A1 | 6/2013 | Hadley et al. |
| 2013/0197984 A1 | 8/2013 | Bhatt et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0262420 A1* | 10/2013 | Edelstein ............ G06F 40/197 707/695 |
| 2013/0318635 A1 | 11/2013 | Verner |
| 2014/0019761 A1 | 1/2014 | Shapiro |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0089661 A1* | 3/2015 | Taschek ............... G06Q 30/02 726/26 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0182237 A1* | 6/2016 | Almgren ............... H04L 9/321 713/155 |
| 2016/0379330 A1* | 12/2016 | Powers ............... G06T 1/0028 382/100 |
| 2017/0247017 A1* | 8/2017 | Lee ..................... B60R 25/302 |
| 2018/0276270 A1* | 9/2018 | Bisbee ............... G06Q 30/0241 |
| 2019/0089702 A1* | 3/2019 | Bhatt ................. H04L 63/0884 |
| 2019/0114692 A1* | 4/2019 | Briggs ................. G06F 16/583 |
| 2021/0203555 A1* | 7/2021 | Kulkarni .............. H04L 67/10 |
| 2021/0334931 A1* | 10/2021 | Kwon ................. H04N 19/467 |
| 2021/0377052 A1* | 12/2021 | Brown ................ H04L 9/3239 |
| 2022/0318432 A1 | 10/2022 | Taschek |

OTHER PUBLICATIONS

ParallelDots, "Emotion Detection Using Machine Learning," Medium, May 3, 2017, 6 pages.

U.S Advisory Action dated Aug. 6, 2020 in U.S. Appl. No. 14/498,666.

U.S. Final Office Action dated Aug. 31, 2018 issued in U.S. Appl. No. 14/498,666.

U.S. Final Office Action dated May 13, 2020 issued in U.S. Appl. No. 14/498,666.

U.S. Final office Action dated Nov. 17, 2022 in U.S. Appl. No. 17/301,545.

U.S. Non-Final office Action dated Jul. 22, 2022 in U.S. Appl. No. 17/301,545.

U.S. Notice of Allowance dated Mar. 13, 2023 in U.S. Appl. No. 17/301,545.

U.S. Office Action dated Oct. 13, 2020 issued in U.S. Appl. No. 14/498,666.

U.S. Office Action dated Oct. 31, 2017 issued in U.S. Appl. No. 14/498,666.

U.S. Office Action dated Oct. 31, 2019 issued in U.S. Appl. No. 14/498,666.

\* cited by examiner

METHODS AND SYSTEMS FOR PROTECTING DATA INTEGRITY

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to data processing. More specifically, this patent document discloses techniques for protecting data integrity.

BACKGROUND

Data integrity may refer to the accuracy and consistency (validity) of data over its lifecycle. Each time data is replicated or transferred, it should remain intact and unaltered. Data integrity can be compromised by hackers or people with ill intention. This can potentially cause the data to be mis-interpreted as being associated with a different context.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAIL DESCRIPTION

Figure 1A:
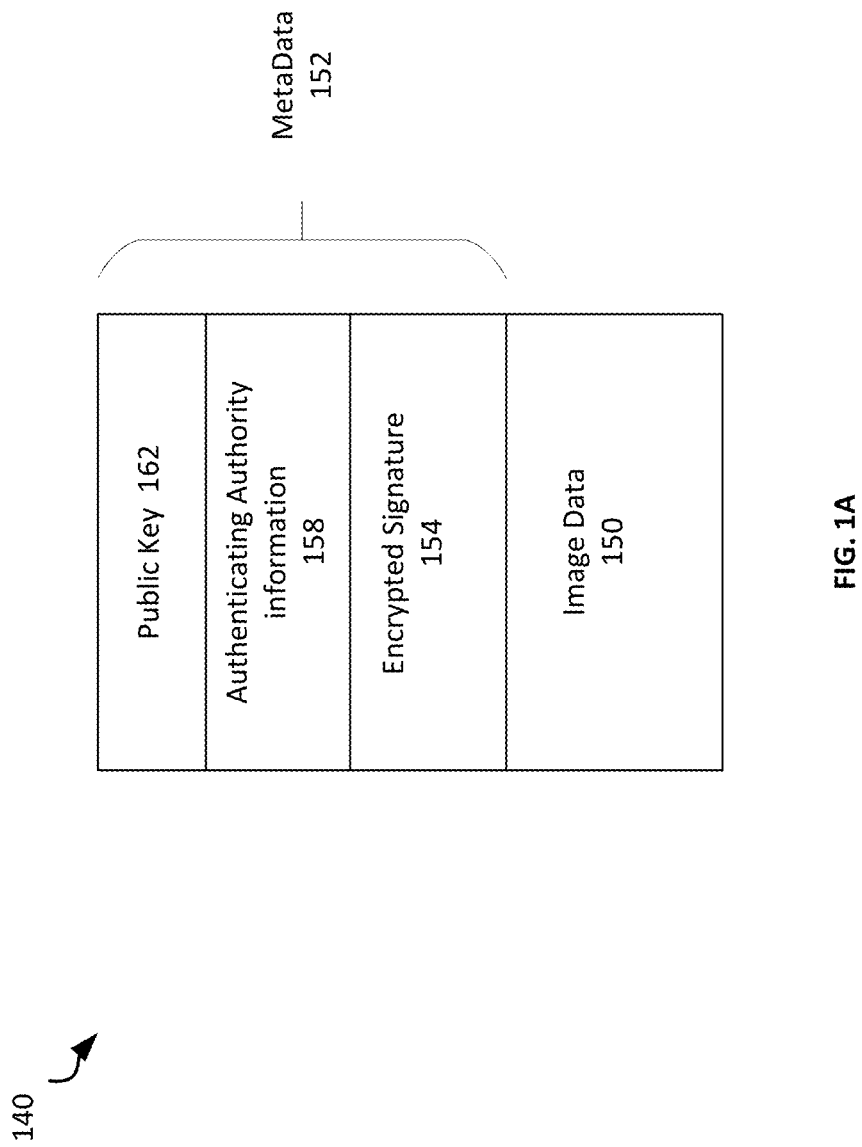
FIG. 1A shows an example image data and its associated metadata, in accordance with some implementations.

Some implementations may include systems and methods for enabling data integrity at an application server. For example, a method may include receiving a first communication comprising first content generated by a first user. Authentication metadata embedded within the first communication may be identified. A second communication generated by a second user may be received. The second communication may include second content and the authentication metadata. The authentication metadata from the second communication may be decoded. The first content of the first communication and the second content of the second communication may be parsed. Based at least in part on the parsing, it may be determined that the first content is different than the second content. An alteration notification may be generated based at least in part on the determining that the first content is different than the second content.

Some implementations may include systems and methods for protecting data integrity for data transmitted across a communication network. For example, a method may include storing data related to a first communication generated by a computer system associated with a first entity in a database. The data related to the first communication may include data associated with an identifier. The data related to the first communication may also include data related to first information associated with the identifier. The identifier may be used to identify the first entity. The systems and methods may further include receiving data related to a second communication generated by a computer system associated with a second entity. The data related to the second communication may include the data associated with the identifier. The data related to the second communication may also include data related to second information associated with the identifier. The second entity may be different from the first entity. When the data related to the second information is determined to be different from the data related to the first information, data related to a notification may be generated to indicate that the first information may have been altered, and the data related to the second communication may be updated to include the data related to the notification. The updated second communication may be stored in the database such that when a request for information associated with the identifier is received from a computer system associated with a third entity, both the data related to the first communication and the data related to the updated second communication may be transmitted to the computer system associated with the third entity.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products may be configured to include using a server computing system associated with a third party authentication service provider to authenticate images such that when the images are transmitted across a network from a sending computing system to a receiving computing system, an unaltered version of the image is received by the receiving computing system. For some implementations, when an altered version of the image is received, notification may be generated to indicate that the image has been altered.

Some implementations may include a system for enabling data integrity. The system may include one or more hardware processors and memory, the memory comprising computer program instructions that, when executed by the one or more hardware processors, cause the one or more hardware processors to perform storing data related to a first communication generated by a first entity in a database, the data related to the first communication including data associated with an identifier and data related to first information associated with the identifier, the identifier used to identify the first entity; receiving data related to a second communication generated by a second entity, the data related to the second communication including the data associated with the identifier and data related to second information associated with the identifier, the second entity being different from the first entity; and based on determining that the data related to the second information is different from the data related to the first information: (a) generating data related to an alteration notification; (b) updating the data related to the second communication to include the data related to the alteration notification; and (c) storing the updated data related to the second communication in the database.

For some implementations, an image may be associated with an encrypted signature. The encrypted signature (also referred to as a first encrypted signature) may be generated using a public key of a public and private key pair. The public and private key pair may be associated with the third-party authentication service provider. The encrypted signature may be generated based on the image data associated with the image. The encrypted signature may not be modified. For some implementations, the public key may be stored as metadata associated with the image. Metadata is generally the information that is used to understand how to interpret and use the data. For example, the metadata associated with an image may be stored in a database table, and link information may be used to link the metadata to the associated image data. Different techniques may be used to generate and store the metadata. FIG. 1A shows an example image data and its associated metadata, in accordance with some implementations. Diagram 140 shows image data 150 and associated metadata 152. The metadata 152 may include encrypted signature 154, authenticating authority information 158, and public key 162.

When an image is transmitted from a sending computing system to a receiving computer system, both the image data 150 and the encrypted signature 154 may be transmitted together. When the image data 150 is stored in a database, both the image data 150 and its encrypted signature 154 may be stored together. For example, the encrypted signature 154 may be stored as metadata associated with the image 150. For some implementations, the encrypted signature may be associated with data identifying the third-party authentication service provider. For example, the data identifying the third-party authentication service provider 158 may be stored as metadata associated with the image. The third-party authentication service provider may be associated with a server computing system that may be remote from a computer system that receives the image.

Figure 1B:
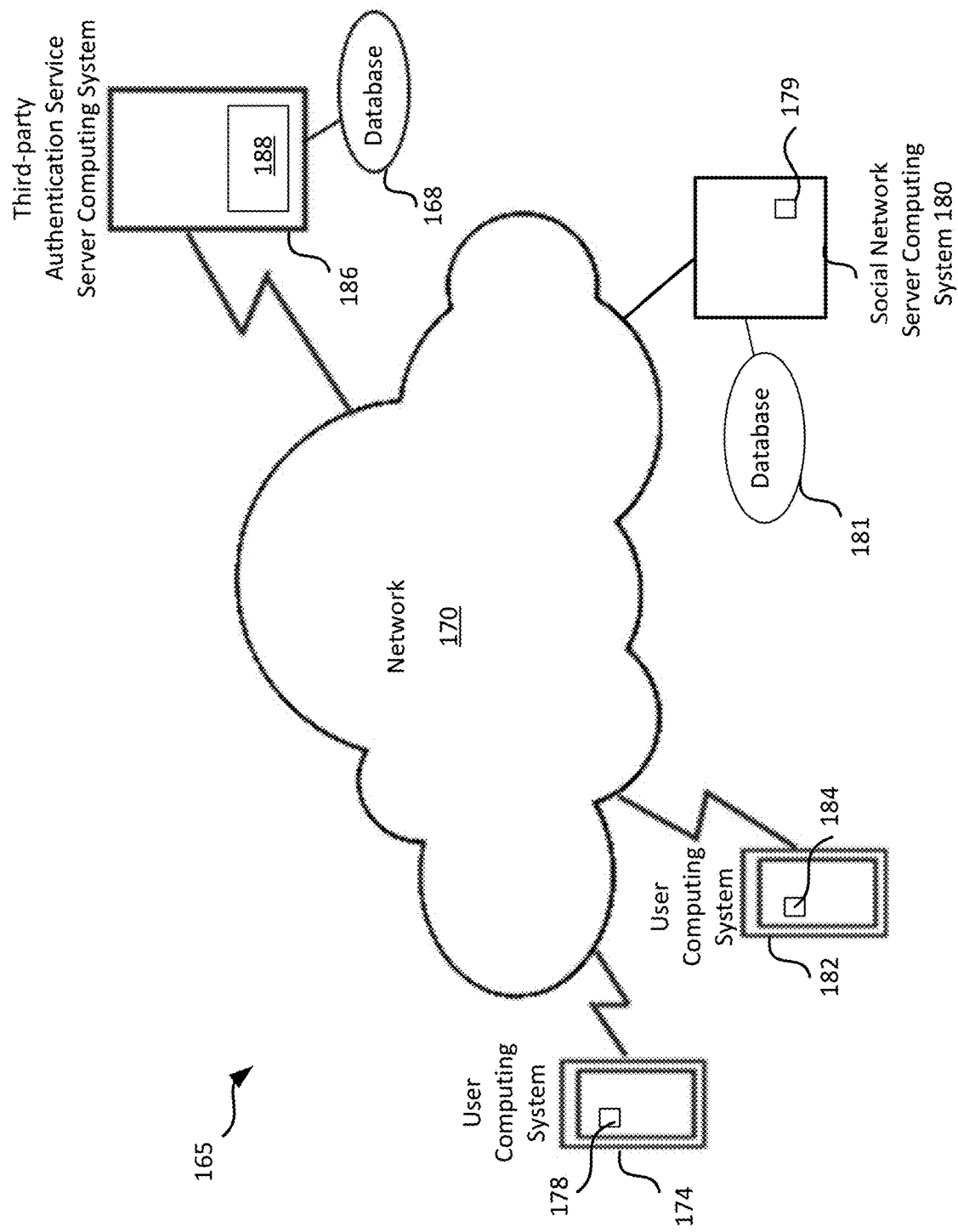
FIG. 1B shows an example network environment that may be used with some implementations.

FIG. 1B shows an example network environment that may be used with some implementations. In diagram 165, the image data 150 and the metadata 152 may be stored in a database 181 associated with the social network server computing system 180. The image data 150 may be associated with a first entity. For example, the image data 150 may be generated by the first entity. User computing system 174 may be used by a second entity to access and receive the image data 150 stored in the database 181 by first connecting to the social network associated with the server computing system 180. The image associated with the image data 150 may or may not be altered by the second entity. User computing system 182 may be used by a third entity to access and receive the image data 150 stored in the database 181 after the image associated with the image data 150 has been accessed by the second entity. As such, it may be helpful to verify the authenticity of the image associated with the image data 150 and, if the image has been altered, notify the third entity about the alteration.

A client application 178 may be installed in a receiving computing system 174. The client application 178 may be configured to communicate with the server computing system 186 associated with the third-party authentication service provider to verify the integrity of the image data. For example, the client application 178 may be configured to be installed as an add-on to a browser of the receiving computing system 174. The client application 178 may be triggered when it detects the loading of an image by the browser. For example, the loading of an image may occur when a user uses the receiving computing system 174 to connect to a social network application executing in a social network server computing system 180 and opens a web page associated with the social network. The content of the web page may include images, and the integrity of one or more of the images may be protected by the third-party authentication service provider. For example, the content of the web page may include postings of members of a social network. The postings may include an original post and a repost of the original post.

The client application 178 may detect that an image is protected by the third-party authentication service provider by reviewing the metadata associated with the image. When an image is protected, the client application 178 may generate another encrypted signature (also referred to as a second encrypted signature) using the public key 162 and the image data 150 of the image received with the web page. The client application 178 may be configured to use the network 170 to transmit both the first encrypted signature and the second encrypted signature to the server computing system 186 associated with the third-party authentication service provider to verify whether the image has been altered. The third-party authentication service provider may use the private key 188 of the public private key pair to decrypt the first encrypted signature and the second encrypted signature. The private key 188 may be stored in the database 168. When the first encrypted signature is determined to be different from the second encrypted signature, the image data may have been altered, and the server computing system 186 associated with the third-party authentication service provider may communicate with the client application 178 to cause the client application 178 to generate a notification to indicate that the image may have been altered. For example, the image may have been altered by someone using the computing system 182 and use the application 184 to alter the image.

For some implementations, the operations described with the client application 178 may be performed by verification application 179 executing in the server computing system 180. For example, when a request is received to download a web page that includes images that are to be authenticated, the verification application 179 may communicate with the server computing system 186 to determine whether the image has been altered. For some implementations, the verification application 179 may perform its operations automatically after an image has been accessed and then subsequently stored in the database 181. Encrypted signatures may be used by the verification application 179 similar to the operations performed by the client application 178. Other authenticating techniques that do not make use of encrypted signatures may also be used to authenticate the image. When an image is determined to have been altered, the verification application 179 may cause a notification to be coupled with the image such that when the image is displayed on a web page, the notification may also be displayed.

For some implementations, the server computing system 186 associated with the third-party authentication service provider described above may be configured to authenticate image data and text data associated with the image data. When the image data and the text data are transmitted across a network from a sending computing system to a receiving computing system, the client application in the receiving computing system may be used to determine whether the image data and the text data have been altered. For some implementations, one or more of the image data and text data may be associated with a unique identifier. For example, the unique identifier may represent an entity. The unique identifier may be stored as metadata associated with the image.

For some implementations, one or more of the image data and the text data may be associated with a specific emotion. As such, when one or more of the image data and text data is altered, the specific emotion may also be altered. For some implementations, a neural network such as convolutional neural network or recurrent neural network may be used to detect emotion. The neural network may be trained using a training dataset such as, for example, a dataset of emotions. The dataset of emotions may include thousands of samples that may be linked to many possible emotions that may be conveyed by texts and/or images. For example, the range of emotions may include "happy", "pleased", "relaxed", "calm", "bored", "depressed", "annoy", "afraid", etc. Different machine learning techniques may be used to detect emotion from texts and from images. For example, a facial emotion detection using machine learning may be used to detect emotion of human included in images, and emotion detection from text using machine learning may be used to extract context from texts that can be attributed to an emotion. For some implementations, the neural network may be trained to detect sentiment associated with one or more of image and text data. For example, the neural network may be based on Einstein Artificial Intelligence (AI) technology developed by Salesforce.com of San Francisco, California.

For some implementations, an emotion that is detected from an image or from a text may be stored as metadata and may not be modified. When the image or text or both the image and text are sent from a sending computing system to a receiving computing system, the associated emotion metadata may also be sent. At the receiving computing system, a client application may be triggered by the receiving of the emotion metadata, and the emotion detection operations may be performed on the associated image or text or both. This emotion detection may enable the client application to verify whether the detected emotion is different from the emotion stored in the metadata, and whether one or both of the image and the text have been altered.

For some implementations, the verification to determine whether an image or a text has been altered may be performed by the server computing system that is configured to store the image or the text such as, for example, the server computing system 179. For example, when an emotion detection neural network associated with the server computing system 179 detects a difference in emotion between an original post and a repost of the original post, a notification about the difference may be generated by the server computing system 179 and stored in the database 181.

Figure 1C:
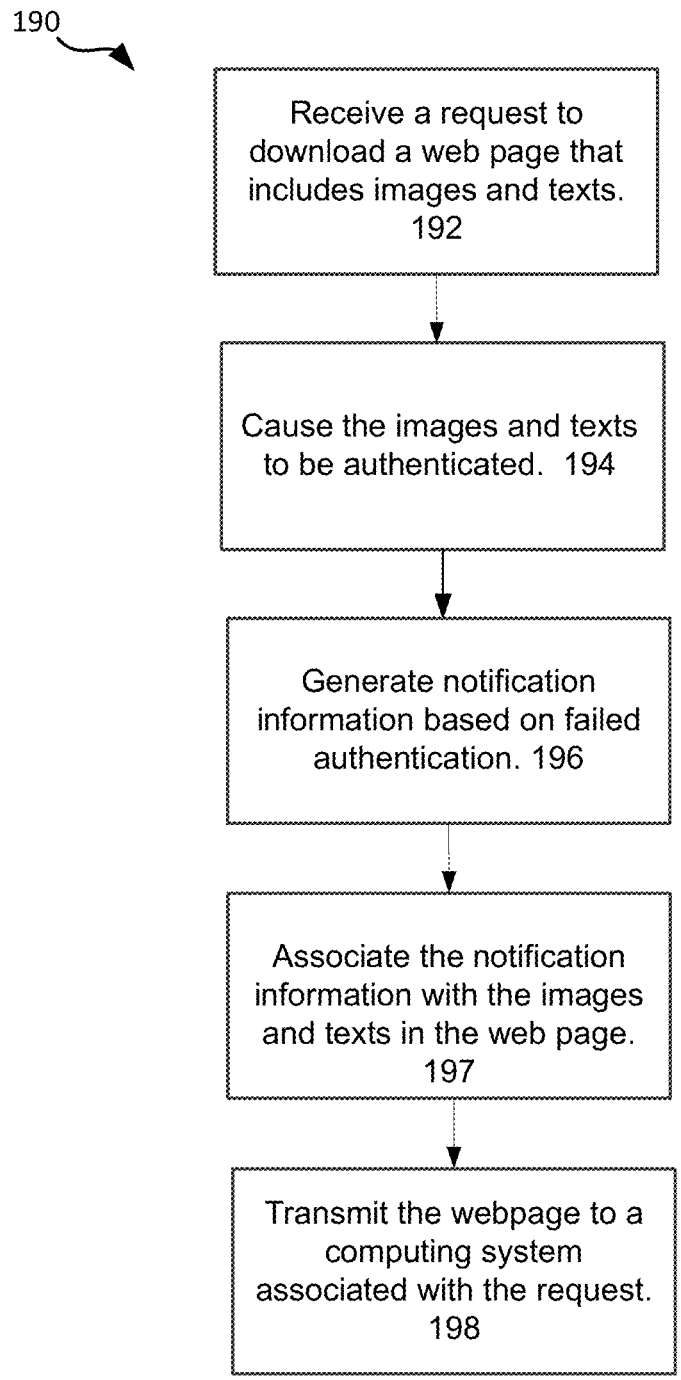
FIG. 1C shows an example flow diagram of a process that may be used with some implementations.

FIG. 1C shows an example flow diagram of a process that may be used with some implementations. The example process shown in flow diagram 190 may be performed by a server computing system. For example, the server computing system may perform operations associated with a social network. The process may enable authenticating current version of images and texts based on original version of the messages and texts.

At block 192, a request to download or view a web page may be received. The web page may include images and texts. Some of the images and texts may be identified as images and texts that need to be authenticated. For example, the identification may be performed by evaluating the metadata associated with the image data and text data. At block 194, the server computing system may initiate a request to have the current version of images and texts authenticated. The current version may be the same as the original version if the images and texts have not been altered. The request may be transmitted to a server computing system associated with a third-party authentication service provider. The request may include information unique to an original version of the images and texts. For example, the information may be in the form of an encrypted signature.

At block 196, the third-party authentication service provider may perform comparison operations to verify the authentic nature of the current version of the images and texts. This may include, for example, performing the emotion detection operations using machine learning. Based on the third-party authentication service provider determining that the images and texts have been altered, the server computing system may be configured to generate a notification indicating information related to the alteration. At block 197, the notification may be coupled with the altered image or altered text. For example, the notification may be displayed on the web page adjacent to an altered image. At block 198, the web page may be transmitted to a computing system associated with the requester of the request to download the web page.

It may be noted that the techniques described with FIG. 1A, FIG. 1B and FIG. 1C may be applied to protect the integrity of one or more of images or texts as they are transmitted over a communication network. The techniques may be useful in many applications to help prevent the recipients of the images or the texts from being misled by altered images and/or altered texts.

In a conventional social networking system such as Twitter®, Facebook® or Yammer®, a user can easily mislead other users and tarnish a brand's reputation by commenting on, sharing, retweeting, reposting, or otherwise republishing a feed item such as a post mentioning the brand and editing the item's content. By way of illustration, Orlando's, a small but popular vegetarian-friendly restaurant, has published an advertisement as a post to a Facebook® feed viewable by various users, some of whom follow Orlando's. Oliver, a troublemaker, edits and reposts the content of the advertisement. In particular, Oliver adds a note in his repost stating that "Orlando's famous ranch dressing contains rendered pork lard," even though in reality the dressing is entirely vegetarian. This misinformation could potentially alienate Orlando's large vegetarian customer base and, ultimately, devastate Orlando's business. Some of the disclosed techniques can be implemented to protect the content of Orlando's original post and hamper Oliver's ability to spread misinformation.

For instance, a communication such as a social networking post can be protected by embedding metadata within the communication's content. Such metadata could include specific information uniquely identifying a brand, referred to herein as a brand identifier. For instance, a unique string such as 183745 could be assigned to Orlando's Restaurant as a brand identifier, while other various entities are identified by different strings. In some implementations, metadata can be formatted as an image, which is placed within the content of a post. When the post is graphically displayed in a user interface, such an image can be obscured to users viewing the post, as explained in more detail below. By way of example, the string 183745 identifying Orlando's Restaurant can be embedded as Extensible Metadata Platform (XMP) metadata in a Joint Photographic Experts Group (JPEG) image file. Along these lines, a visible watermark image that is destroyed when tampered with, such as a logo identifying the Orlando's brand, can be included in Orlando's posts. Also or alternatively, a text checksum value can be generated for, and embedded in, each of Orlando's posts. Examples of techniques for embedding and interpreting metadata as well as characteristics of such metadata can vary greatly across implementations and are described in further detail below.

Using some of the disclosed techniques, Orlando's restaurant can in some ways control its brand reputation by placing metadata in posts published by or on behalf of Orlando's. In some implementations, if Oliver edits the content of Orlando's original post, Oliver can be prevented from publishing the edited post to social network feeds. Also or alternatively, an indication of tampering such as an animated red flag or text such as "warning: the following post has been edited" can be automatically added to the content of Oliver's edited version of Orlando's post when the edited post is published to a feed.

The disclosed techniques can be used to protect or authenticate a wide range of brand-affiliated content, since the type of brand can vary greatly across implementations. By way of illustration, Celia is both a sales agent and employee of the month at Touchstone Insurance, a corporation selling insurance. Celia has several personal brands in the form of her name, her job title as a sales agent, her role or position in an organizational hierarchy, and her badge(s), one of which is employee of the month. Touchstone Insurance also is a brand in the form of the name of the corporation. Confusingly for Rosalind, a Touchstone customer, Touchstone has thousands of sales agents each with their own set of brands, some of which are different from Celia's brands. Making matters worse, Rosalind often cannot tell the difference between a junk solicitation or scam and a legitimate communication from an actual agent, especially if the agent is not someone with whom Rosalind is familiar. Rosalind's confusion can be addressed if Touchstone Insurance were to embed metadata with brand identifiers in all of its communications from its employees such as Celia and other sales agents. The brand identifiers can be configured to indicate to customers that senders of the communications have brand equity or expertise within Touchstone. For instance, if Rosalind receives a communication from Celia, Rosalind can confirm Celia's expertise because the embedded metadata can be processed to authenticate Celia's status both as an agent at Touchstone and as employee of the month.

Embedding metadata in social networking communications to identify brands can also be useful in managing database records in a database system. For instance, records of posts or reposts containing embedded metadata can be identified in and organized using one or more database tables. By way of illustration, Audrey, a marketing manager, is evaluating the "all the world is a stage" marketing campaign to promote her theater company's recent outdoor productions throughout the Forest of Arden. Metadata can be embedded in all posts, using a variety of phrases, related to the "all the world is a stage" marketing campaign. Each time the metadata identifying the "all the world is a stage" marketing campaign appears in a post, a record of the post can be stored in a database. Audrey can then evaluate the campaign's effectiveness at a granular level by examining the database records to determine the effectiveness of each of the variety of phrases used in the campaign.

Some but not all of the techniques described or referenced herein are implemented as part of or in conjunction with a social networking system. Social networking systems have become a popular way to facilitate communication among people, any of whom can be recognized as users of a social networking system. One example of a social networking system is Chatter®, provided by salesforce.com, inc. of San Francisco, California. salesforce.com, inc. is a provider of social networking services, Customer Relationship Management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media communications submitted by a user or can otherwise be generated in response to user actions or in response to events. Examples of social media communications include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media communications created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media communication, such as a user-generated post of text data, and a feed tracked update to a record or profile, such as a change to a field of the record. Feed tracked updates are described in greater detail below. A feed can be a combination of social media communications and feed tracked updates. Social media communications include text created by a user, and may include other data as well. Examples of social media communications include posts, user status updates, and comments. Social media communications can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media communications and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media communications, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Figure 1D:
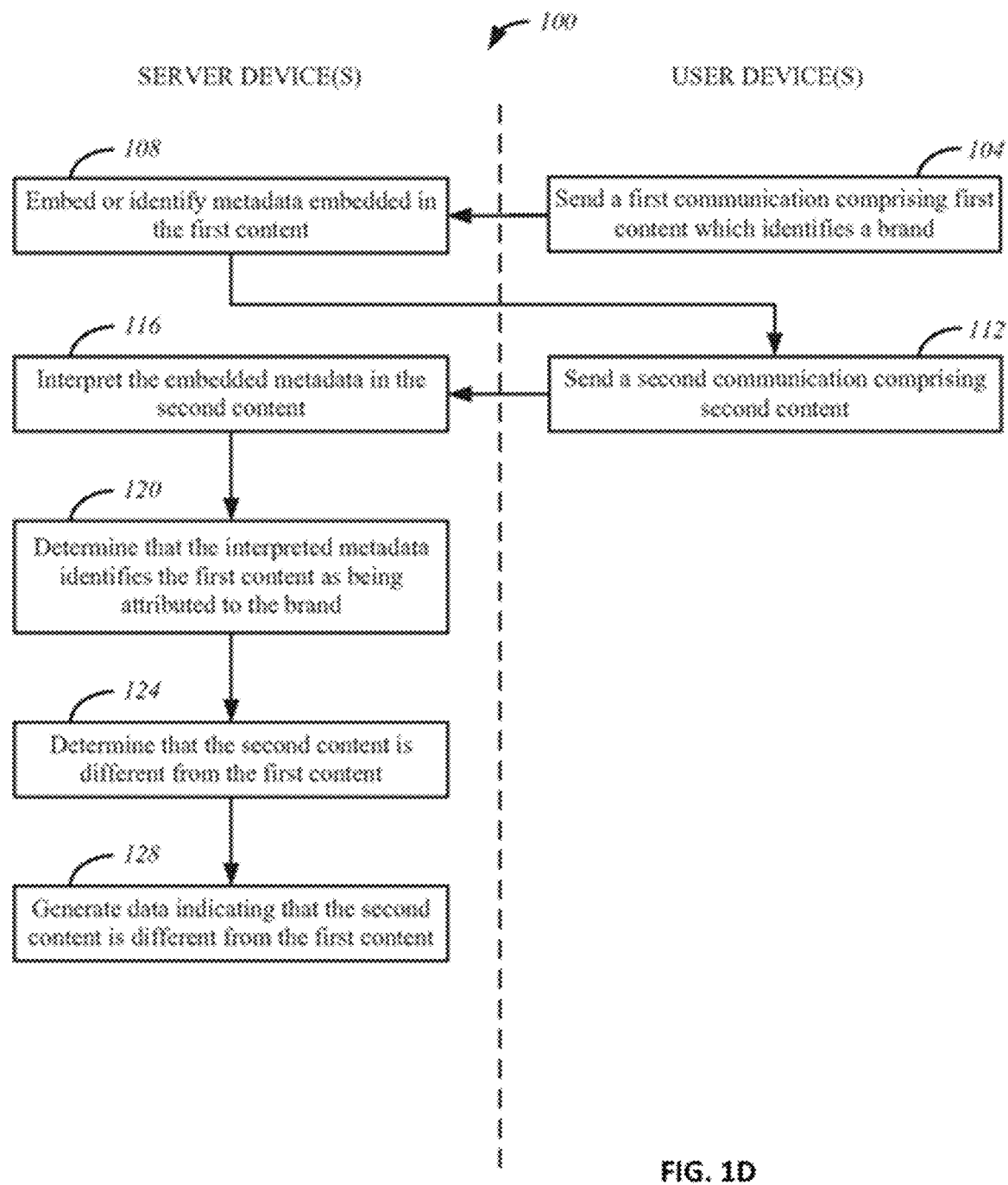
FIG. 1D shows a flowchart of an example of a computer implemented method 100 for protecting brand-associated content of communications in a social networking environment, performed in accordance with some implementations.
Figure 2:
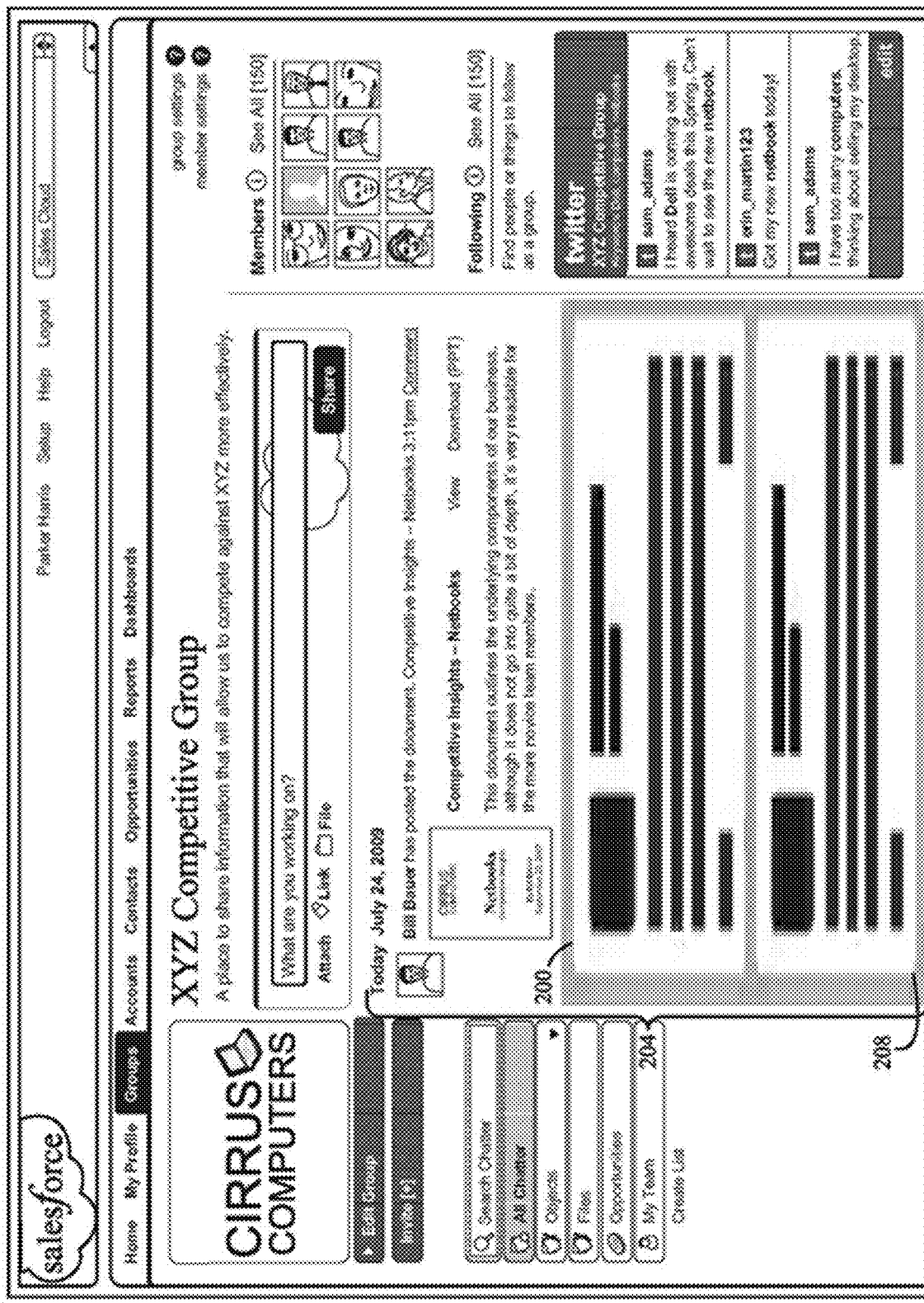
FIG. 2 shows an example of a presentation of a social network feed in the form of a graphical user interface (GUI) as displayed on a computing device, in accordance with some implementations.
Figure 3:
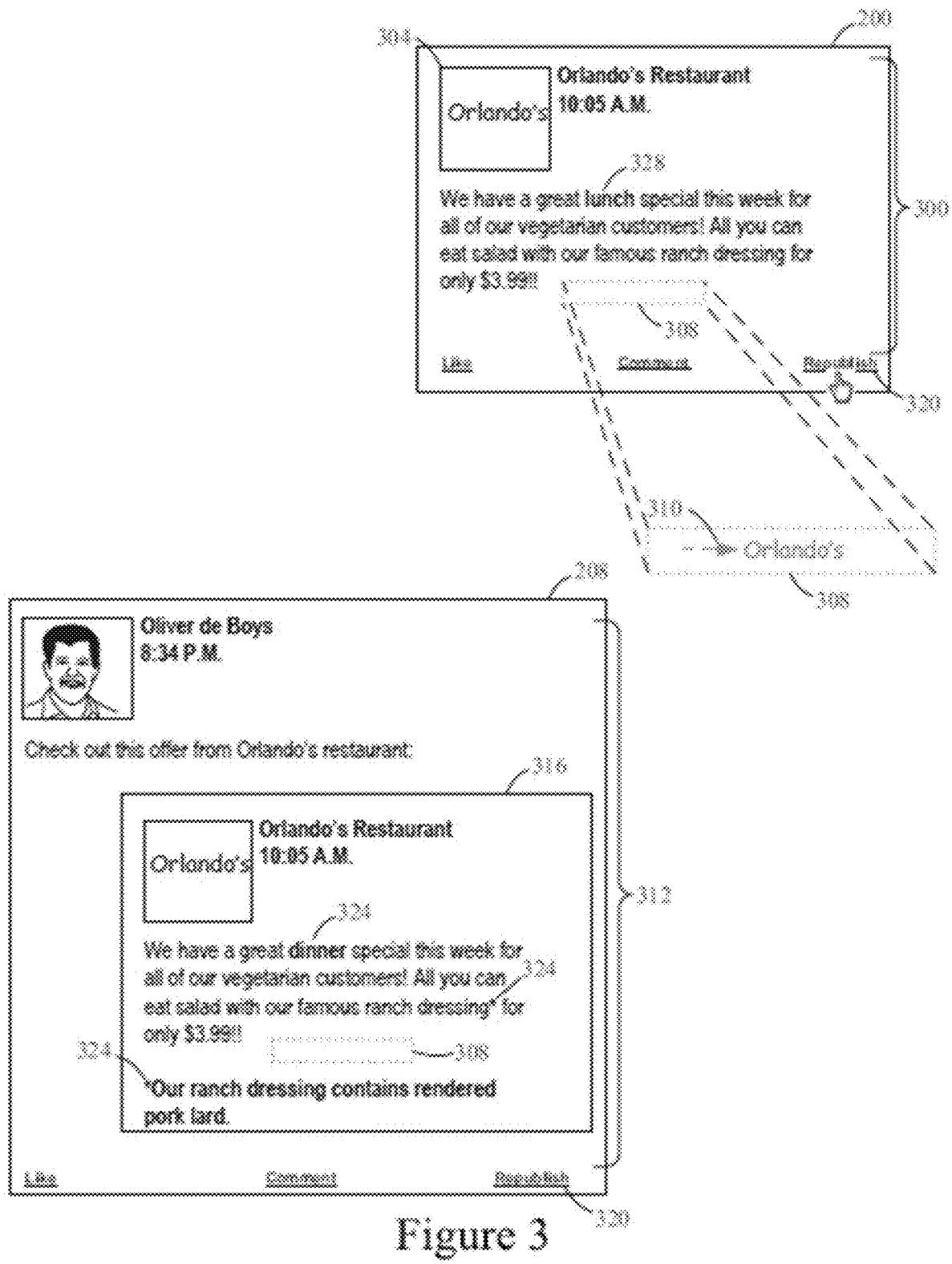
FIG. 3 shows a presentation of posts of a social network feed as displayed on a computing device, in accordance with some implementations.

FIG. 1D shows a flowchart of an example of a computer implemented method 100 for protecting brand-associated content of communications in a social networking environment, performed in accordance with some implementations. FIG. 1D is described with reference to FIGS. 2 and 3. FIG. 2 shows an example of a presentation of a social network feed in the form of a graphical user interface (GUI) as displayed on a computing device, in accordance with some implementations. FIG. 3 shows a presentation of posts of a social network feed as displayed on a computing device, in accordance with some implementations.

In FIG. 1D, at 104, a first communication in the form of a post 200 including first content 300 is sent from a user's computing device such as a smartphone or tablet to one or more servers of a social networking system. For example, an employee of Orlando's restaurant can author post 200 to mention Orlando's and submit the post to one or more feeds. As shown in FIG. 3, content 300 of post 200 contains an advertisement for Orlando's Restaurant telling users that Orlando's has "a great lunch special this week for all of our vegetarian customers! All you can eat salad with our famous ranch dressing for only $3.99!!"

In this example, content 300 identifies the brand "Orlando's" 304, which is the name of a business organization. In other examples, the brand could be a product name such as Orlando's famous ranch dressing. In some implementations, a brand might be a service name such as Charles the Wrestler's premium Tae Kwon Do lessons, a job title such as Vice President of Marketing, or a badge, which could indicate expertise in a particular area. A brand could even be a personal role such as "Queen of Sales", which could describe the saleswoman who has had the highest number of sales in a given year.

In FIG. 2, when a server receives post 200, the server can publish post 200 to a social network feed 204 or delay publishing post 200 until processing post 200 to embed or analyzed metadata embedded in post 200, as further described below.

Returning to FIG. 1D, at 108, metadata 308 of FIG. 3 can be embedded in first content 300. In some implementations, Orlando's might be relying upon a server to embed metadata 308. For example, Orlando's might have signed up for a cloud-based service, such as Chatter® provided by Salesforce.com®. In this scenario, Orlando's might pay a fee in order to have metadata 308 automatically inserted in any content submitted to Chatter® by Orlando's. Metadata 308 can be embedded in content 300 in a wide variety of ways. For example, as shown in FIG. 3, metadata 308 includes an alphanumeric string encoded as Extensible Metadata Platform (XMP) metadata in a Joint Photographic Experts Group (JPEG) image file.

Also or alternatively, first content 300 can include contextual information such as a location from which first content 300 was posted. By way of example, location services such as Near Field Communications (NFC) or iBeacons® can be used to determine the location of a user's computing device when post 200 is sent from the computing device at 104. A map system such as Google Maps® can then be used to determine that post 200 was sent from Orlando's Restaurant in the Forest of Arden. Information identifying that post 200 was sent from Orlando's Restaurant can then be included in first content 300.

Alternatively, at 108, metadata can be identified as being embedded in content 300. By way of example, metadata 308 may have already been embedded in post 200 by an employee of Orlando's before post 200 is received by a server. In this scenario, since metadata 308 has already been embedded in post 200 at the time that post 200 is received by a server, metadata 308 can be identified in the content of post 200.

The dotted line surrounding metadata 308 in FIG. 3 would not appear in the user interface when content 300 is rendered on a display device. Rather, the dotted line illustrates that metadata 308 would be obscured when rendered on a display device. Such image-obscuring can be accomplished in a number of fashions. For example, an image can be formatted to be the same color or pattern as the background of a region of a user interface in which content 300 is displayed. In FIG. 3, both the background of post 200 and the image containing metadata 308 are white. Also or alternatively, an image can be obscured if the image is so small that it is invisible to a human user when rendered on a computing device. For example, a healthy human eye cannot generally resolve images with a width less than approximately 0.05 mm at a distance of 15 cm, whereas the width of a pixel on a 640 dots per inch (DPI) display is approximately 0.04 mm.

Embedded metadata 308 can contain a wide variety of information including a brand identifier 310 for Orlando's Restaurant. Several other non-limiting examples of information that might be contained in metadata 308 are described below. For instance, embedded metadata 308 might include a reference to content 300, post 200, or both. In some scenarios, such as when a communication is part of a conversation in a feed, embedded metadata 308 could include a reference to the conversation. Additionally, in some situations, when for example a post is part of an ongoing editing process, embedded metadata 308 can include an identification of a version of the first content, a history of edits to the first content, or both. Also or alternatively, embedded metadata 308 can include programmable logic that identifies the first content and prevents it from being edited.

Returning to FIG. 1D, at 112, a second communication in the form of a post 208 shown in FIG. 3 includes second content 312. In this example, Oliver de Boys has copied content 300 into post 208 and submitted post 208 to a server to be published on one or more feeds, for instance, as a republication of post 208. In FIG. 2, when a server receives post 208, the server can publish post 208 to a social network feed 204 or delay publishing post 208 until processing post 208 to interpret metadata 308 embedded in post 208, as further described below.

In some implementations, content 312 of post 208 includes an edited version 316 of content 300 of post 200. In the example of FIG. 3, content of a post such as post 200 can be easily edited by Oliver before being republished in response to Oliver clicking or tapping republish button 320. That is, the republish button 320 enables an editable version of content 300 to be displayed for a user to modify content 300 before it is published to a feed. By the same token, because content 312 was originally generated to include content 300, content 312 also contains embedded metadata 308.

Returning to FIG. 1D, at 116, embedded metadata 308 in content 312 of post 208 is interpreted. In some implementations, embedded metadata 308 might be encoded, and interpreting the embedded metadata 308 could include decoding the metadata. For example, when content 312 is rendered, embedded metadata 308 can be decoded by way of a hexadecimal algorithm provided at a server of the social networking system. In some implementations, the encoding and decoding process could be dynamic with a continuously changing hexadecimal algorithm. Alternatively, the algorithm can remain constant.

One skilled in the art will appreciate that existing techniques, such as public key cryptography, could serve as or be combined with some of the disclosed encoding/decoding techniques for extra security. For example, a public key to decode embedded metadata 308 could be provided to social networking users, while a private key to encode metadata 308 could be provided exclusively to a business, such as Orlando's Restaurant. Thus, any social networking user could view content posted by Orlando's Restaurant, but only Orlando's Restaurant would be able to generate official and original content containing metadata 308.

Returning to FIG. 1D, at 120, it is determined that the interpreted metadata identifies content 300 as being attributed to brand 304. For example, metadata 308 contains a brand identifier 310 for Orlando's Restaurant as mentioned above. Therefore, by comparing brand identifier 310 with a list of brand identifiers maintained in a database, first content 300 can be linked with Orlando's Restaurant.

In FIG. 1D, at 124, second content 312 is compared with first content 300, using standard text comparison techniques, to determine that content 312 is different from content 300. In the example of FIG. 3, when comparing content 312 with content 300, any differences between the content can be identified. For example, textual information 324 of content 312 not included in content 300 can be identified. In this example, Oliver edited content 300 by clicking or tapping republish button 320 to add data 324, namely "*Our ranch dressing contains rendered pork lard." Oliver also edited content 300 to replace "lunch" 328 with the word "dinner" 324. Also or alternatively, a tool such as WordNet® can be used to determine whether content 300 and content 312 have similar meanings even if content 300 and content 312 are phrased differently.

In FIG. 1D, at 128, when any differences are detected at 124, data is generated indicating that content 312 is different from content 300. In some implementations, such data can be stored in a database. For example, as part of the "all the world is a stage" marketing campaign described above, marketing manager Audrey might post an advertisement for the "all the world is a stage" campaign on her theater company's feed in a social networking platform. The advertisement might contain embedded metadata identifying the "all the world is a stage" campaign. Audrey can then send a request for data from her computing device to a server of the social networking platform. Any social network communications containing the embedded metadata identifying the "all the world is a stage" campaign can be identified, no matter how the phrasing of each communications varies. Information identifying these social network communications can be sent to Audrey's computing device. Audrey can then see how often and in what context the advertisement has been reposted and she can determine whether the "all the world is a stage" campaign has been successful. She can examine granular details surrounding different components of the campaign, tracking the flow of her advertisements through social media. For instance, differently phrased posts that relate to the "all the world is a stage" campaign can each contain embedded metadata identifying the campaign. Thus, Audrey can make minor changes and add nuances to social media advertisements for the campaign and track the effectiveness of each change.

Figure 4A:
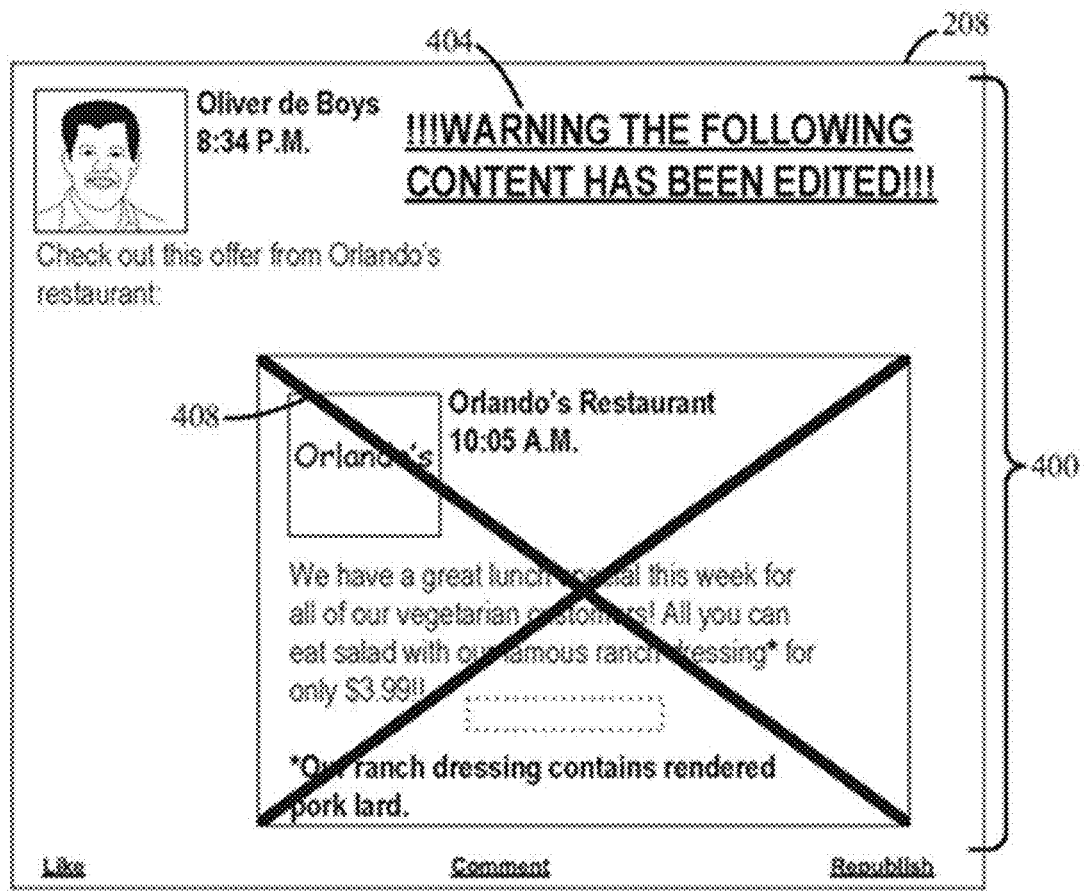
FIG. 4A shows a presentation of a social networking post including edited content as displayed on a computing device, in accordance with some implementations.

Data generated at 128 of FIG. 1D could also be used in a variety of manners to protect content 300. FIG. 4A shows a presentation of a social networking post including edited content as displayed on a computing device, in accordance with some implementations. In the example of FIG. 4A, once the data generated at 108 of FIG. 1D is sent to a user's device, the device can process the generated data to display a presentation 400 indicating that second content 312 is different from first content 300. While the precise contours of presentation 400 can vary across implementations, in one example presentation 400 includes a textual warning 404, namely "!!!WARNING THE FOLLOWING CONTENT HAS BEEN EDITED!!!" indicating that first content 300 and second content 312 are different. Also or alternatively, presentation 400 can include a graphic 408 in the form of a large "X" across the edited content indicating that the content is suspect.

Figure 4B:
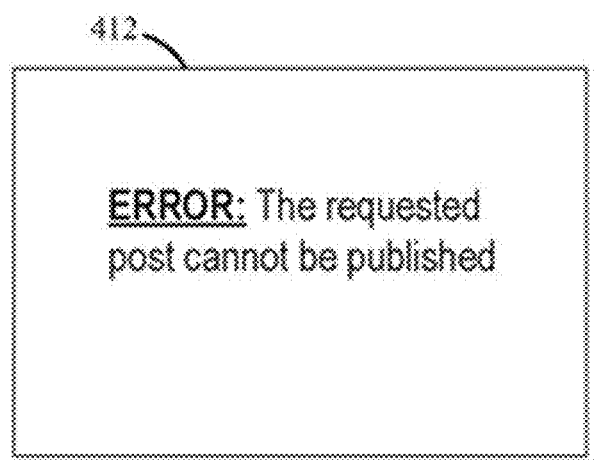
FIG. 4B shows a presentation of an error message as displayed on a computing device, in accordance with some implementations.

In some implementations, in response to detecting any modifications to brand-associated content or even a keystroke in which a user attempts to modify content, a user can be prevented from publishing any such modified content. For example, FIG. 4B shows a presentation of an error message as displayed on a computing device, in accordance with some implementations. In this example, embedded metadata 308 includes programmable logic that identifies first content 300 and prevents it from being edited. If an authoring engine has the ability to detect when a key stroke is pressed, a trigger can fire when a keystroke has been pressed to prevent first content 300 from being edited. Otherwise, any number of changes accepted by the authoring system can be parsed and compared to the source text of first content 300. In this scenario, error message 412 might be rendered on a user device if the user attempts to publish an edited version of content 300.

In some other implementations, the disclosed techniques can be used to trigger an offer or coupon for a wide variety of products or services. By way of example, Aliena is an avid Ganymede Cola drinker and a loyal Ganymede customer. Metadata embedded in Ganymede's social networking posts contains a brand identifier as well as an offer or coupon such that the offer coupon is generated for a user who shares or republishes content including the embedded metadata. If Aliena reposts or shares a Ganymede advertisement containing such metadata, an electronic offer or coupon can be emailed to Aliena's email account. This may incentivize users to share content and increase brand exposure for Ganymede Cola.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
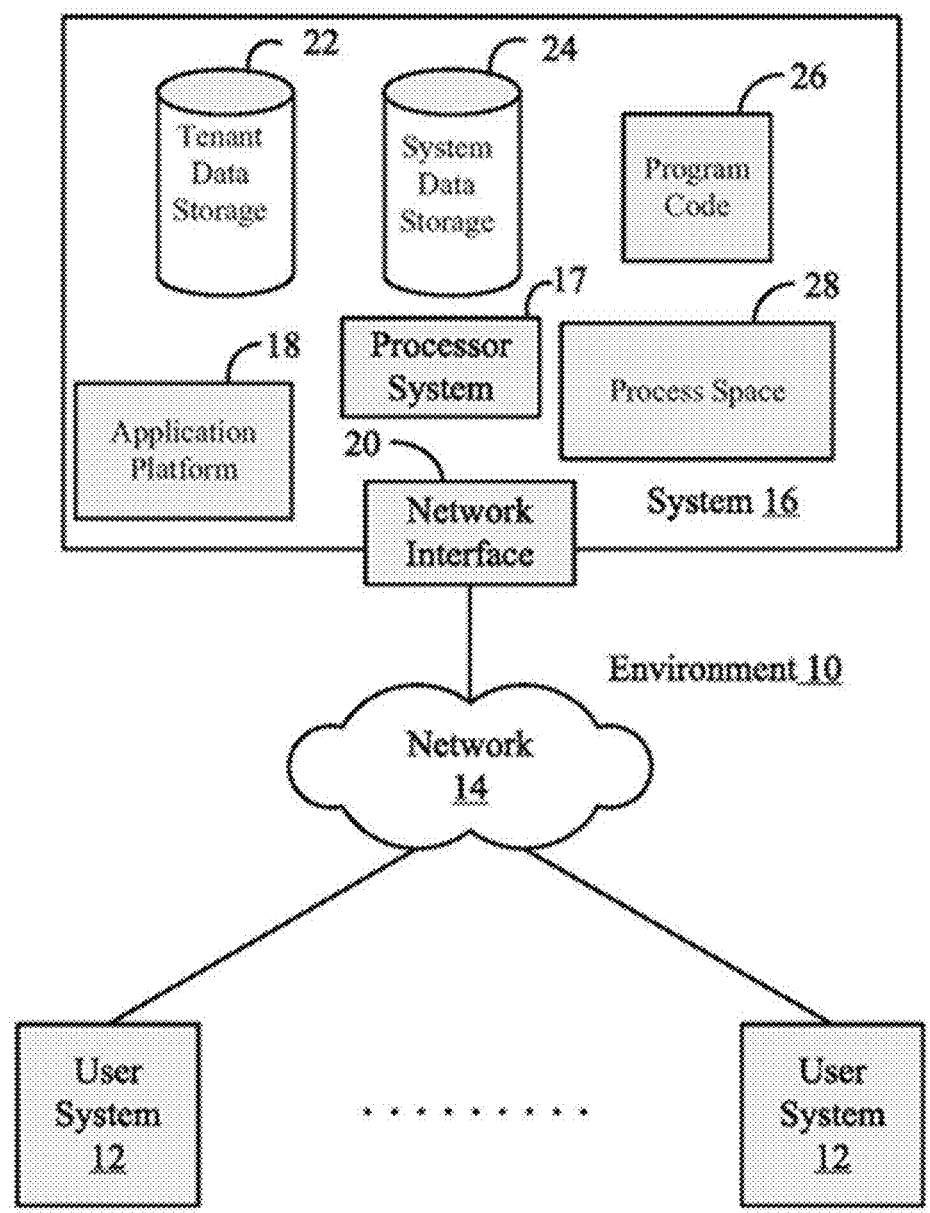
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 5B:
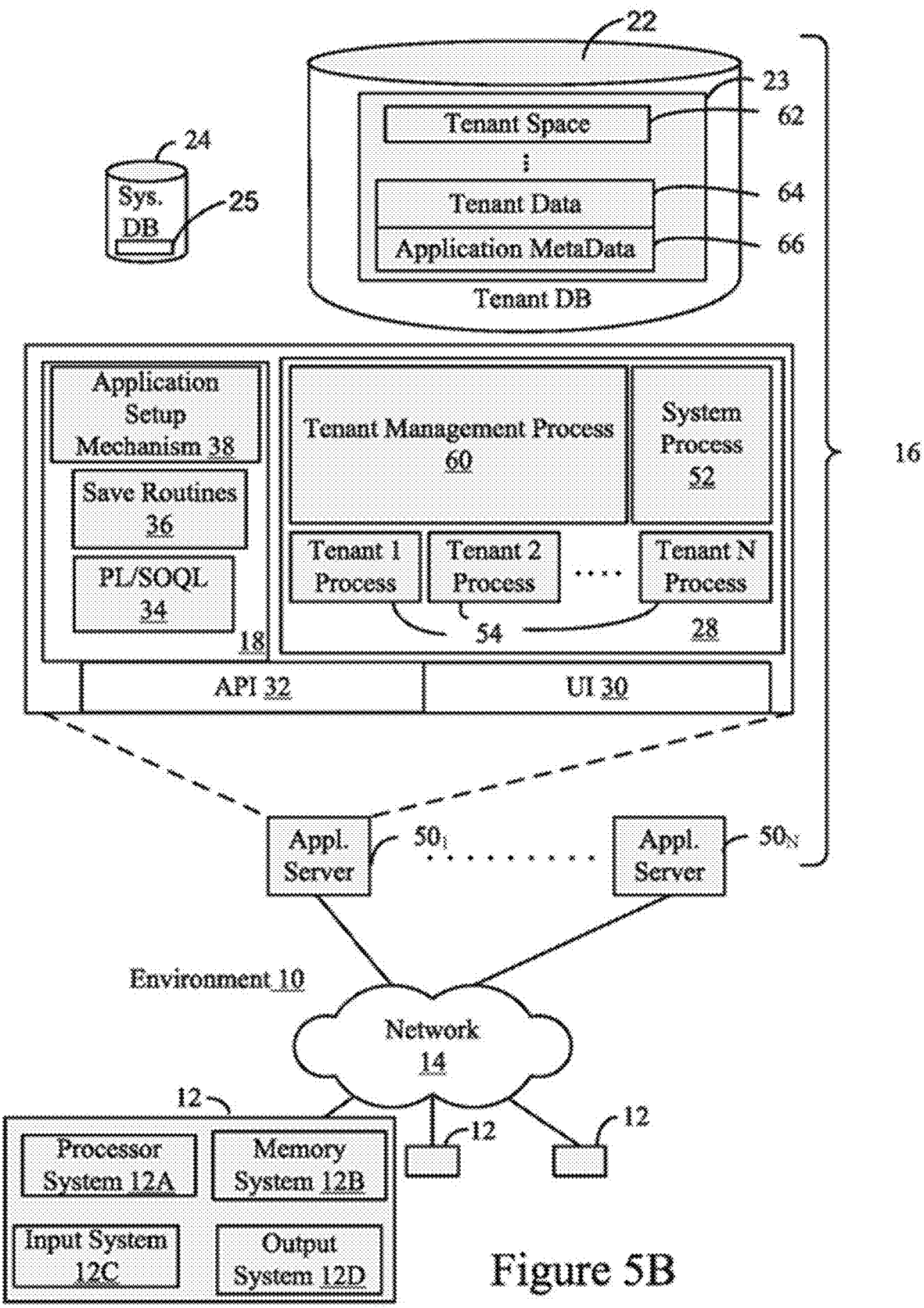
FIG. 5B shows a block diagram of an example of some implementations of elements of FIG. 5A and various possible interconnections between these elements.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
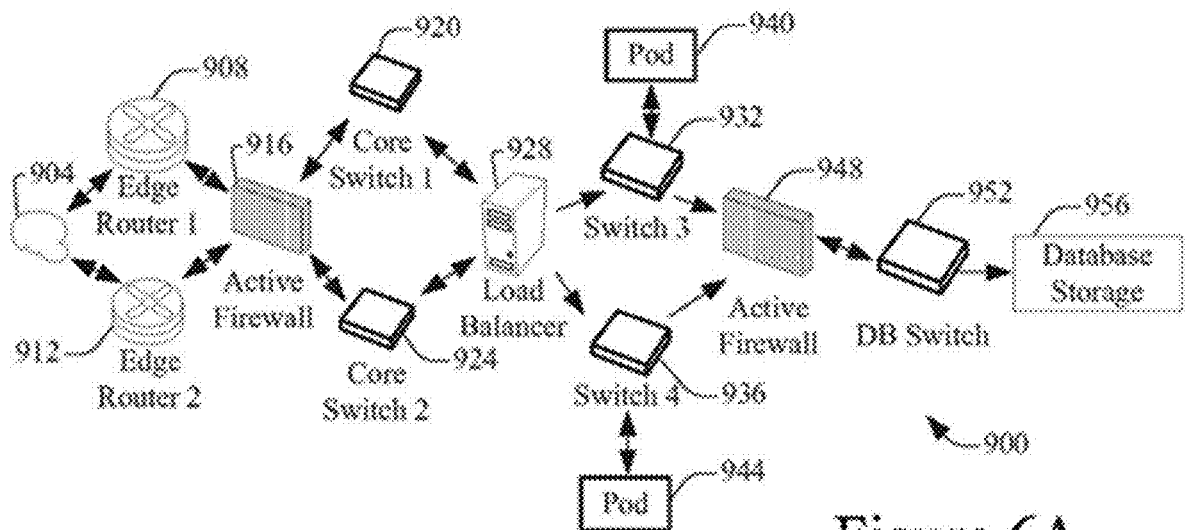
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
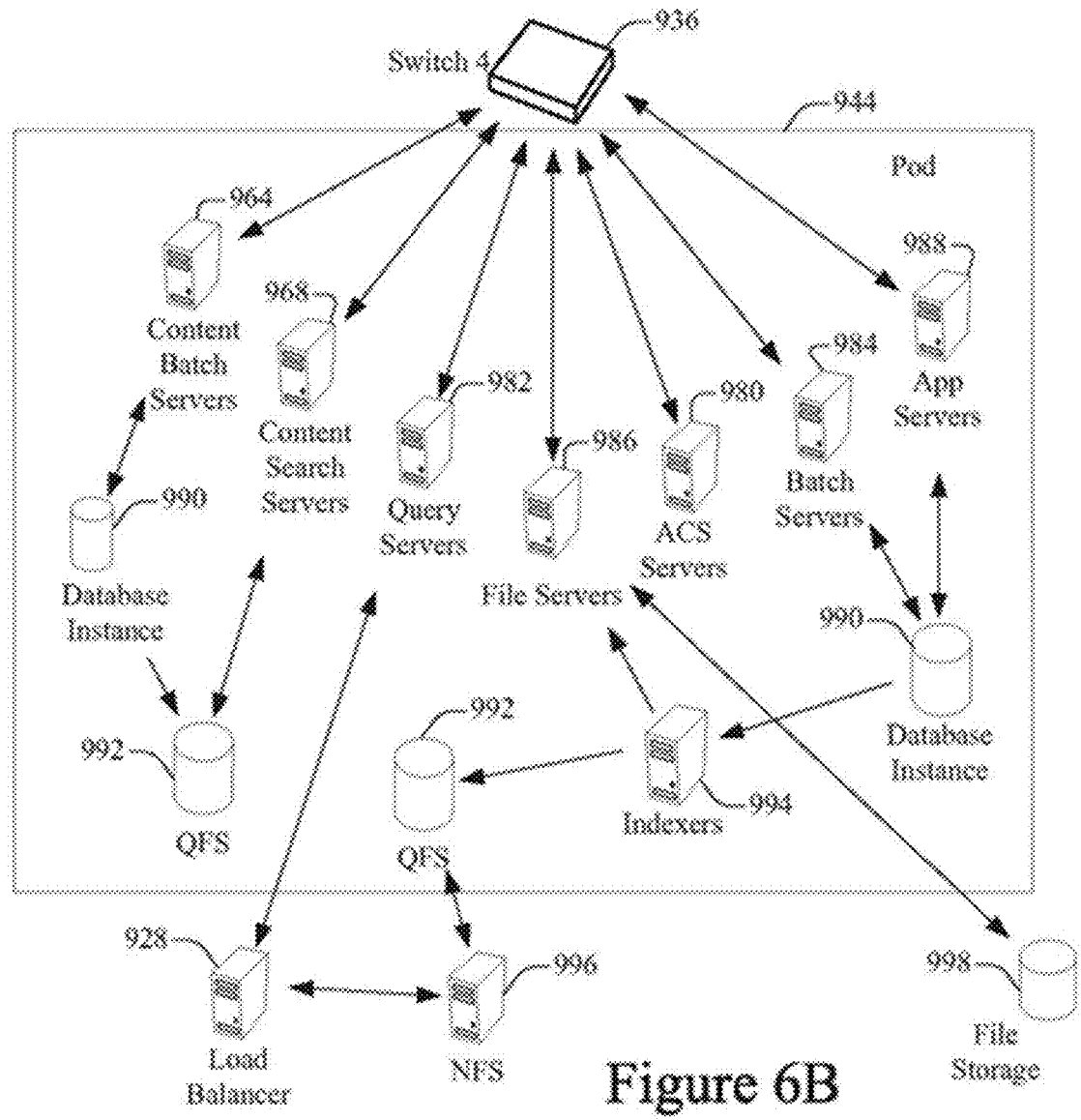
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-4B. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented method comprising:
receiving, by an application server, a first communication comprising first content generated by a first user;
identifying authentication metadata embedded within the first communication, the authentication metadata comprising data associated with the first user;
receiving, by the application server, a second communication generated by a second user, the second communication comprising second content and the authentication metadata;
determining if the authentication metadata from the second communication belongs to the first user by at least processing the authentication metadata from the second communication and the authentication metadata from the first communication;
parsing, by the application server, the first content of the first communication and the second content of the second communication;
comparing, by the application server, the first content with the second content in response to determining that the authentication metadata from the second communication belongs to the first user;
determining that the first content is different than the second content based at least in part on the parsing and the comparing; and
based at least in part on the determining that the first content is different than the second content, sharing, on a social network system, a version of the second communication, the version comprising an alteration notification indicating that information of the second content has been altered.

2. The method of claim 1, further comprising:
embedding, by the application server, the authentication metadata into the first communication.

3. The method of claim 1, wherein identifying the authentication metadata comprises:
decoding the authentication metadata in the received first communication.

4. The method of claim 1, wherein the authentication metadata comprises location information associated with the first user.

5. The method of claim 1, wherein the authentication metadata embedded within the first communication indicates an identity of the first user.

6. The method of claim 1, further comprising:
preventing display of the second communication based at least in part on the determining that the first content is different than the second content.

7. The method of claim 1, wherein the second communication comprises an edited version of the first communication.

8. A system comprising:
a memory; and
one or more hardware processors configured to cause:
obtaining a first communication comprising first content generated by a first user;
identifying authentication metadata embedded within the first communication, the authentication metadata comprising data associated with the first user;
obtaining a second communication generated by a second user, the second communication comprising second content and the authentication metadata;
determining if the authentication metadata from the second communication belongs to the first user by at least processing the authentication metadata from the second communication and the authentication metadata from the first communication;
parsing the first content of the first communication and the second content of the second communication;
comparing the first content with the second content in response to determining that the authentication metadata from the second communication belongs to the first user;
determining that the first content is different than the second content based at least in part on the parsing and the comparing; and
based at least in part on the determining that the first content is different than the second content, sharing, on a social network system, a version of the second communication, the version comprising an alteration notification indicating that information of the second content has been altered.

9. The system of claim 8, the one or more hardware processors further configured to cause:
embedding the authentication metadata into the first communication.

10. The system of claim 8, wherein identifying the authentication metadata comprises:
decoding the authentication metadata in the obtained first communication.

11. The system of claim 8, wherein the authentication metadata comprises location information associated with the first user.

12. The system of claim 8, wherein the authentication metadata embedded within the first communication indicates an identity of the first user.

13. The system of claim 8, the one or more hardware processors further configured to cause:
preventing display of the second communication based at least in part on the determining that the first content is different than the second content.

14. The system of claim 8, wherein the second communication comprises an edited version of the first communication.

15. A computer program product comprising a non-transitory computer-readable medium storing computer-readable program code to be executed by one or more processors, the program code comprising instructions configured to cause:
obtaining a first communication comprising first content generated by a first user;
identifying authentication metadata embedded within the first communication, the authentication metadata comprising data associated with the first user;
obtaining a second communication generated by a second user, the second communication comprising second content and the authentication metadata;
determining if the authentication metadata from the second communication belongs to the first user by at least processing the authentication metadata from the second communication and the authentication metadata from the first communication;
parsing the first content of the first communication and the second content of the second communication;
comparing the first content with the second content in response to determining that the authentication metadata from the second communication belongs to the first user;
determining that the first content is different than the second content based at least in part on the parsing and the comparing; and
based at least in part on the determining that the first content is different than the second content, sharing, on a social network system, a version of the second communication, the version comprising an alteration notification indicating that information of the second content has been altered.

16. The computer program product of claim 15, the instructions further configured to cause:
embedding the authentication metadata into the first communication.

17. The computer program product of claim 15, wherein identifying the authentication metadata comprises:
decoding the authentication metadata in the obtained first communication.

18. The computer program product of claim 15, wherein the authentication metadata comprises location information associated with the first user.

19. The computer program product of claim 15, wherein the authentication metadata embedded within the first communication indicates an identity of the first user.

20. The computer program product of claim 15, the instructions further configured to cause:
preventing display of the second communication based at least in part on the determining that the first content is different than the second content.

* * * * *